US005103081A

United States Patent [19]

Fisher et al.

[11] Patent Number: 5,103,081

[45] Date of Patent: Apr. 7, 1992

[54] APPARATUS AND METHOD FOR READING DATA ENCODED ON CIRCULAR OBJECTS, SUCH AS GAMING CHPS

[75] Inventors: Laren D. Fisher, Henderson; Leonard I. Vedeen; LeRoy N. Gutknecht, both of Las Vegas, all of Nev.

[73] Assignee: Games of Nevada, Las Vegas, Nev.

[21] Appl. No.: 527,623

[22] Filed: May 23, 1990

[51] Int. Cl.[5] .......................... G06K 5/00; G06K 7/10

[52] U.S. Cl. .................................. 235/464; 235/375; 235/494

[58] Field of Search ............... 235/462, 375, 381, 464, 235/487, 494, 467, 454; 250/223 R; 194/212, 214, 302, 328, 344, 346

[56] References Cited

U.S. PATENT DOCUMENTS

| | | | |
|---|---|---|---|
| 3,409,760 | 11/1968 | Hamisch | 235/494 |
| 3,636,317 | 1/1972 | Torrey | 235/494 |
| 3,808,405 | 4/1974 | Johnson et al. | 235/494 |
| 3,923,158 | 12/1975 | Fornåå | 235/464 |
| 3,991,883 | 11/1976 | Hobler et al. | 235/494 |
| 4,004,131 | 1/1977 | Oneil et al. | 235/494 |
| 4,234,072 | 11/1980 | Prümm | 194/346 |
| 4,333,005 | 6/1982 | Takamatsu et al. | 235/464 |
| 4,582,189 | 4/1986 | Schmitt | 194/346 |
| 4,814,589 | 3/1989 | Storch et al. | 235/454 |

*Primary Examiner*—Robert Weinhardt

*Attorney, Agent, or Firm*—Rosenblum, Parish & Bacigalupi

[57] ABSTRACT

A gaming chip that has a circular bar code imprinted thereon so as to convey information about the issuer of the chip, the chip's denomination, and a serial number which can be utilized to verify the authenticity of the chip. A chip validating device rotates the chip while being maintained in a stationary linear position, such that the encoded information is repeatedly passed before a stationary bar code reader. The validator then uses this information to determine the authenticity of the chip, to indicate the denomination of the chip being wagered, and to accept or reject the chip.

21 Claims, 11 Drawing Sheets

APPARATUS AND METHOD FOR READING DATA ENCODED ON CIRCULAR OBJECTS, SUCH AS GAMING CHPS

BACKGROUND OF THE INVENTION

1. Field of the Invention

The present invention relates generally to gaming chips and more particularly to a circular bar-encoded gaming chip and an apparatus for reading and authenticating the same.

2. Brief Description of the Prior Art

Slot machines and other types of standard gaming systems have typically been configured to accept standard coins of the country or region in which they operate. As the gaming industry has grown, so has the demand for coins of various denominations which can be accepted by such machines, as well as the demand for different types of coin-operated gaming machines. Accordingly, a number of different types of systems have been developed for accepting and verifying the authenticity of various types of coins, as well as a number of different types of resident specific tokens which may be used in the machines in place of coins. Tokens are generally identical in size and weight to one type of coin, such as the large American Eisenhower dollar, and are assigned various denominations by the issuing establishment, where they may be used as an alternative form of tender. In general, these tokens have no legally recognized value in commerce outside of the issuing establishment.

As the demand for such tokens has risen, and the denomination of such tokens has been increased by the issuers, so has the incidence of counterfeiting. Hence, the design and manufacture of the tokens and the corresponding systems for detecting the authenticity of these tokens have become increasingly more sophisticated. A typical coin comparitor is manufactured by Coin Mechanisms, Inc., of Elmhurst, Ill. Coin Mechanisms' Coin Comparitor Model CC-40 operates by optically comparing an input coin with an appropriate sample of that same type of coin. The optical comparison is basically done by aligning the two coins up with one another and attempting to detect differences in the input coin's physical characteristics. If the input coin is authenticated by this visual comparison, the coin will be accepted by the comparitor. Such a system lacks the ability to determine the denomination of input coins having the same size but different denominations.

Because of the popularity of the dollar-size token, most tokens and gaming checks (referred to as chips from hereon) have been manufactured that size. Since similar sized chips are used by many different gaming establishments, the chips have been marked in different ways to distinguish between issuers. Typically, the markings on the chips have only indicated the issuing establishment and the chip's denomination. In order to further distinguish between chips and aid in the sorting of different chips, CHIPCO International Incorporated developed the Craftmanchip Series gaming chips, which are imprinted with an invisible ultraviolet bar code.

The invisible bar code used by CHIPCO is a linear bar code that is imprinted across the front or back face of the chip and which can be automatically scanned by an ultraviolet bar code scanner. Linear bar codes are also used on a wide variety of items, other than gaming chips, to convey a diverse variety of information. To read a linear bar code imprinted on a chip, it is first necessary to align the chip such that the bar code passes the bar code reader such that the bar code can be successfully read. Aligning a circular or disk-shaped object such as a chip so that the chip may pass by a sensor in a linear direction without angular motion is difficult and greatly restricts the type of reading system which can be used with such chips. In addition, since ultraviolet imprinted chips cannot be visually inspected by players before they accept the chips, the players will be hesitant to accept them because the players have no way of visually determining if they are valid or remain valid after accepting them.

Magnetically encoded identification cards and the like have also been used in the gaming industry, such as the Gaming Data System customer identification cards of Dearborn Computer Company of Nevada in Las Vegas, Nev. Magnetic encoding has not found application in gaming chips because of the sensitivity of the magnetic material and the misuse typically imparted on such chips.

SUMMARY OF THE PRESENT INVENTION

List of Objectives

It is therefore a primary objective of the present invention to provide a novel bar-encoded gaming chip which can be read without linearly aligning and moving the chip.

Another objective of the present invention is to provide a novel gaming chip validating system which can quickly and accurately verify the authenticity of a gaming chip.

Another objective of the present invention is to provide a novel gaming chip which may be used in a wide variety of games of chance and which does not require that each game of chance be tailored around variations in the denomination of particular chips.

Another objective of the present invention is to provide a gaming chip validating system which is capable of detecting counterfeit chips and initiating appropriate security procedures.

SUMMARY OF THE PREFERRED EMBODIMENT

Briefly, a preferred embodiment of the present invention includes a gaming chip having a circular bar code imprinted thereon so as to convey information about the issuer of the chip, the chip's denomination, and a serial number which can be utilized to verify the authenticity of the chip. The circular bar code is positioned on the chip so that it may be read when the chip is rotated while being maintained in a substantially stationary linear position and the encoded information is repeatedly passed before a stationary bar code reader. The bar code reader then uses the information obtained from the chip to determine the authenticity of that chip and to indicate the denomination of the chip being wagered.

LIST OF ADVANTAGES OF THE INVENTION

An important advantage of the present invention is that the bar-encoded gaming chip can be read in a non-linear manner.

It is another advantage of the present invention that the gaming chip can be encoded with a significantly greater quantity of information than linearly encoded gaming chips.

These and other objects and advantages of the present invention will no doubt become apparent to those skilled in the art after having read the following detailed description of the preferred embodiment which are contained in and illustrated by the various drawing figures.

DESCRIPTION OF THE PREFERRED EMBODIMENT

Figure 1:
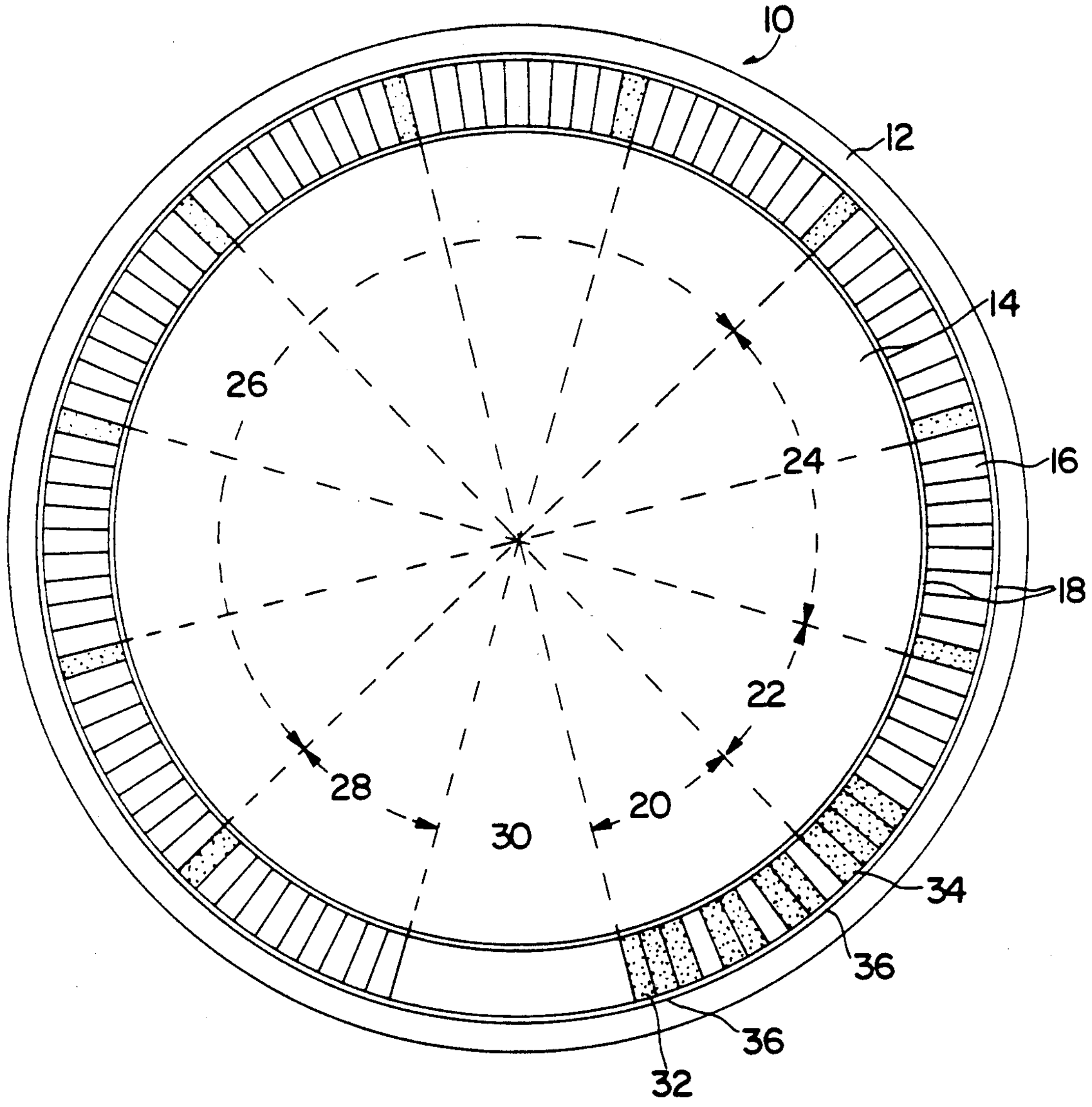
FIG. 1 is plan view of either the top or bottom of a gaming chip in accordance with a preferred embodiment of the present invention.

FIG. 1 is a plan view of a disk-shaped gaming chip embodying the preferred orientation of a circularly-shaped bar encoded region formed thereon. The gaming chip 10, also sometimes referred to as a token, coin, table check or check, is generally assigned a monetary value by a particular issuer and may be used to place wagers in a wide variety of games of chance, such as "21" or poker. Chip 10 may also be used in a wide variety of gaming machines, such as slot machines or other coin-operated type machines. The approximate diameter of chip 10 is 1.418 inches. Chip 10 is equivalent in size and weight to an American Eisenhower dollar coin.

As depicted in FIG. 1, Chip 10 is intended to have identical markings on either side so that the same information can be read from either side. Gaming chips are typically made from a hard plastic material or from hard-packed clay which can be colored and shaped in accordance with a design mold. Chip 10 has an outer rim portion 12 and an inner portion 14 which are separated by the circular bar code 16 embedded within the groove 18.

The circular bar code 16 is typically created from a permanently imprinted circular band of plastic having an adhesive backing for securing it within groove 18. The depth of groove 18 and the thickness of circular bar code 16 are such that the top and bottom surfaces of chip 10 are smooth and flush when bar code 16 is in place. Alternatively, each chip could be created from a mold which is uniquely designed so as to form bar encoded regions within the chip's surface. Although such a chip would prevent circular bar code 16 from being removed and tampered with, it would also typically increase the cost of producing the chips in mass quantities.

Circular bar code 16 is typically divided into twelve individual sectors, but these sectors may be electronically combined to form sectors of various sizes, such as sectors 20 through 30. Each sector contains indicia representative of a plurality of data bits, which in turn serve to identify the chip 10. For example, a sector 20 contains the equivalent of a start bit, (start bit 32), a stop bit, (stop bit 34), and eight data bits, (the data bits generally shown as 36). The indicia, or bits, are either colored or uncolored to indicate whether the bit is a binary one or zero. For instance, when illustrated on white paper using black ink for the drawing, black indicia could be assigned a binary zero and white indicia could be assigned a binary one. Typically, a binary encoded bit is utilized to indicate that a condition associated with that bit is either "on" or "off", i.e., a white bit means the condition is on and a black bit means the condition is off. The status of the condition and the binary value of the bits can be arbitrarily designated in accordance with the logic principles governing the electronic interpretation of the information contained within the circular bar code 16.

In currency sector 20, the eight data bits 36 are coded so as to indicate the currency type of the chip 10. For example, the code conveyed by the data bits 36 may indicate that chip 10 is in dollars, or francs or yen. Denomination sector 22 is encoded to convey the denomination of chip 10, such as one, five or ten dollars. Casino identification sector 24 is encoded to convey the number which is utilized to identify the particular gaming establishment which has issued and will honor the chip. Serial number sector 26 is encoded to convey the unique serial number which is assigned to that particular chip. Chip sum sector 28 is encoded to verify that the number of bits read corresponds to the number of bits originally imprinted on chip 10. Hence, chip sum sector 28 functions to assure that each chip is correctly read and to prevent tampering with the coding on that chip. Finally, blank sector 30 is utilized to inform the validating device of the starting point from which circular bar code 16 should be read.

Figure 2:
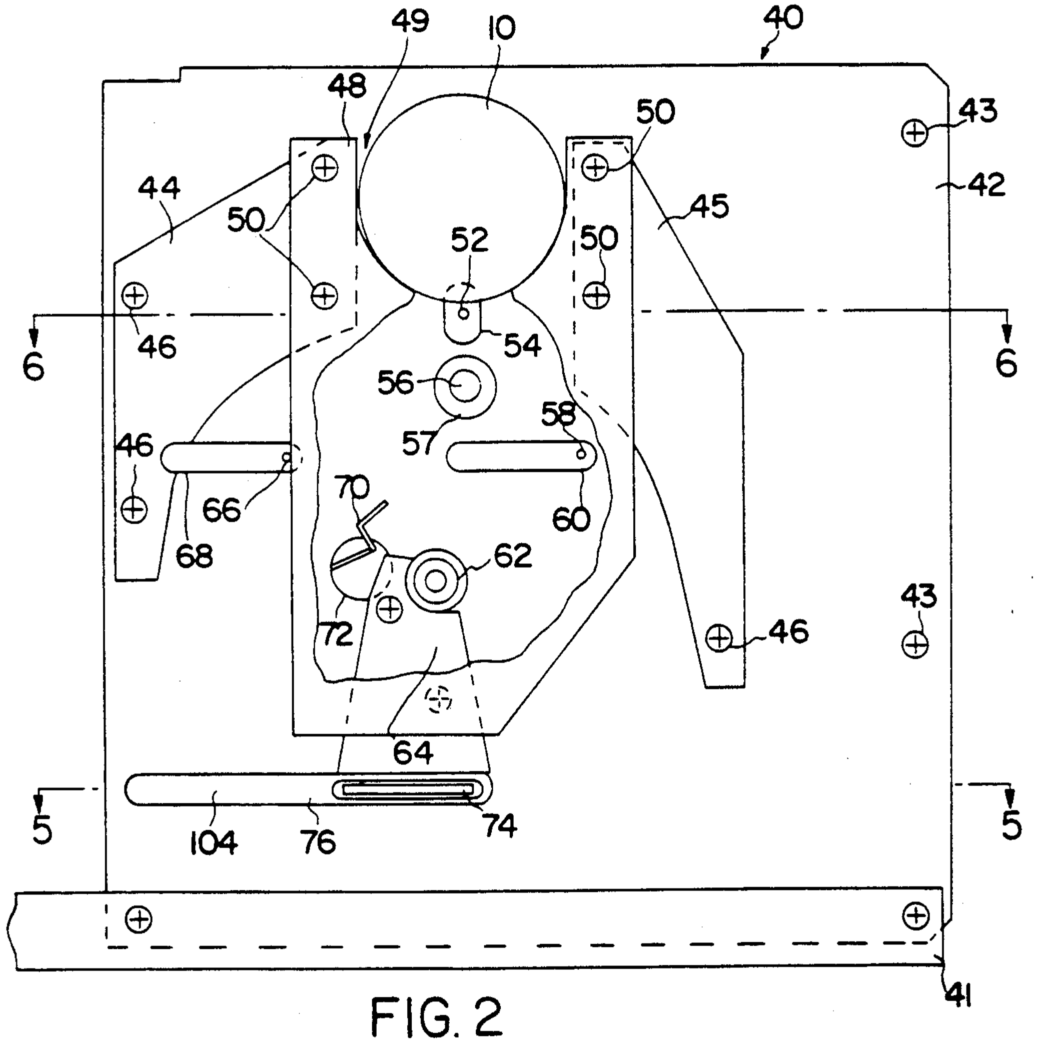
FIG. 2 is a partially broken, front elevational view of a table chip validating device showing the table chip in the lockout position in accordance with a preferred embodiment of the present invention.

FIG. 2 illustrates a chip validator 40 for reading and verifying the authenticity of the gaming chip 10 in accordance with a first preferred embodiment of the present invention. Validator 40 is positioned within a gaming machine (not shown) by a bracket 41, which is affixed to the front side of a back plate 42, and by screws 43 which secure it to other supports (not shown) within the gaming machine. Also affixed to the front side of back plate 42 are left-chip guide 44 and right-chip guide 45, secured by screws 46. A front cover plate 48 is then positioned over the opening between guide 44 and guide 45 and secured by screws 50, which also serve to hold the guides 44 and 45 in place. As shown, front cover plate 48 has a semicircular cut-out 49 at its top so that chip 10 may be inserted and specifically directed into validator 40 when inserted into the gaming machine.

When chip 10 is inserted into the gaming machine, it is typically guided into the reading area of the validator. This is because lockout pin 52 is normally in an actuated-in position when the machine is on-line. When the machine is taken off-line, a jam or tilt occurs, or another chip is detected to currently be in the reading area, lockout pin 52 will be in an actuated-out position, so that a substantial portion of the pin is projecting out of the plane identified by the front surface of back plate 42, thereby preventing chip 10 from being accepted by the machine. Lockout pin 52 is positioned so as to be substantially centered within a lockout pin hole 54 which extends through back plate 42.

Figure 3:
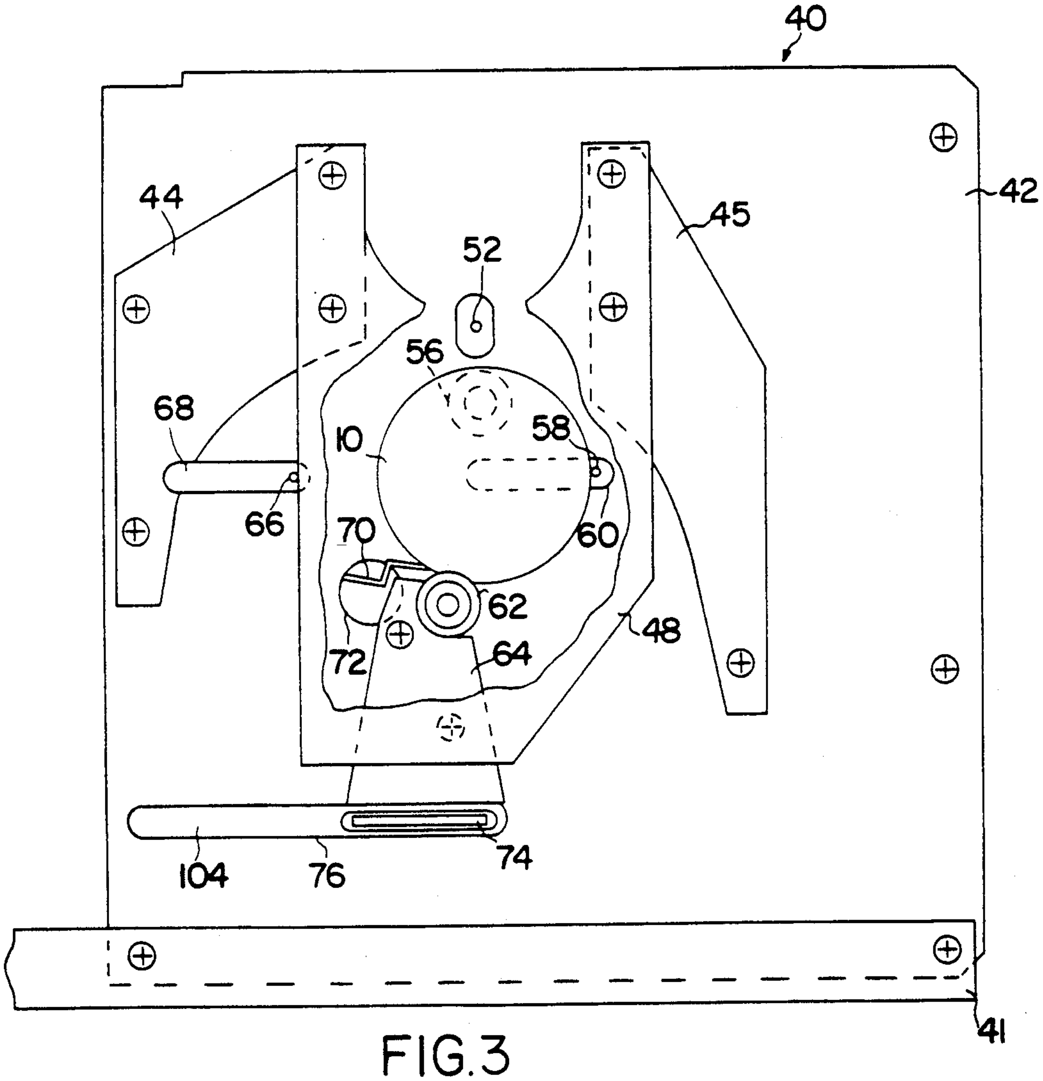
FIG. 3 is a partially broken, front elevational view of the table chip validating device of FIG. 2 showing the table chip in the read position.

When lockout pin 52 is in its normally actuated-in position, chip 10 will be guided into the reading area of validator 40, as depicted with reference now to chip 10 in FIG. 3. When chip 10 enters the reading area, it is positioned within the optical detection range of an optical sensor 56. As is described hereinafter, the sensor 56 is engaged to the rear face of the backplate 42, thus a hole 57 is formed through the backplate 42 to permit sensing of the chip 10 by the sensor 56. Sensor 56 is typically an optically-reflective sensor which is capable of reading the encoded information imprinted on chip 10 when chip 10 is rotated substantially parallel to the plane identified by the front surface of back plate 42 and maintained in a substantially stable linear position. Sensor 56 could also be a magnetic sensor, if chip 10 was magnetically encoded, or a laser, if chip 10 was encoded by means of ablution techniques.

To maintain chip 10 within the proper reading position, chip 10 is positioned so as to rest against positioning pin 58, projecting through positioning pin slot 60, and drive wheel 62, affixed to a DC drive motor (shown in FIG. 7). Drive wheel 62 is off-center in relation to the chip 10 as it enters the validator 40 such that when chip 10 is guided into the reading position it is cradled between the drive wheel 62 and positioning pin 58.

To further guide chip 10 into the proper reading position, an accept pin 66 is provided within an accept pin slot 68. A substantial portion of the pin 66 projects out of the plane identified by the front surface of back plate 42 so that any substantial movement of chip 10 out of the reading position is impeded. The accept pin 56 is engaged at its inner end to a linear slide bar 90 that is described in detail hereinafter. When chip 10 is guided into the proper reading position, it also engages wireform detector switch 70, which results in an electrical signal being transmitted to the drive motor, thereby activating drive wheel 62. Wireform detector 70 is bent so as to be assured of contacting chip 10 when it is guided into the reading position and extends to the back side of back plate 42 through wireform detector hole 72.

Figure 8:
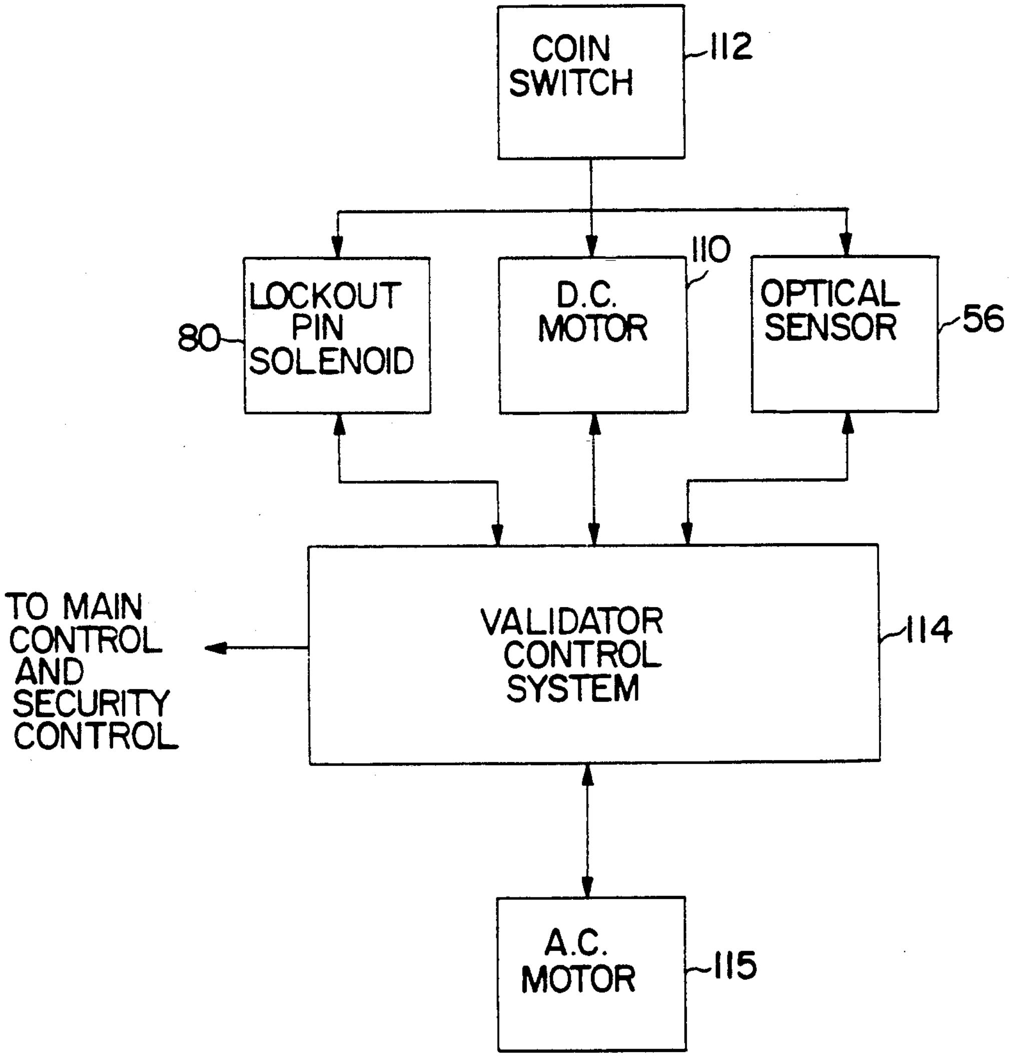
FIG. 8 is a block diagram schematically illustrating the validator control device's association with the electro-mechanical and electro-optical elements of the validating device of FIG. 7.

After the validator 40 has read the information encoded on chip 10, the validator's control system (shown in FIG. 8) processes the information and indicates to the validator 40 whether the chip is to be accepted or rejected. If the chip is to be accepted, both the accept pin 66 and the actuated-out positioning pin 58 are moved to the positions illustrated in FIG. 4, so as to create an open passage between left chip guide 44 and a center chip guide 64, through which an accepted chip may pass. At the same time that accept pin 66 and positioning pin 58 are moved so as to clear the way for passage of the accepted chip 10, a slide bar 74 is moved within slide bar slot 76 in the same direction so as to clear an opening amongst any previously accepted chips which would have prevented the presently accepted chip from dropping down onto bracket 41.

Initially, an accepted chip 10 will drop onto the upper surface of slide bar 74 after being pushed out of the reading position, and will stay on top of slide bar 74 until the slide bar is moved back to its normally withdrawn position, as illustrated in FIG. 2. When slide bar 74 is moved to its normal position, the accepted chip then drops down onto bracket 41 and into the opening which was created for the accepted chip. When another chip 10 is accepted by the machine, the previously accepted chip will then be moved out of the way by slide bar 74.

Figure 4:
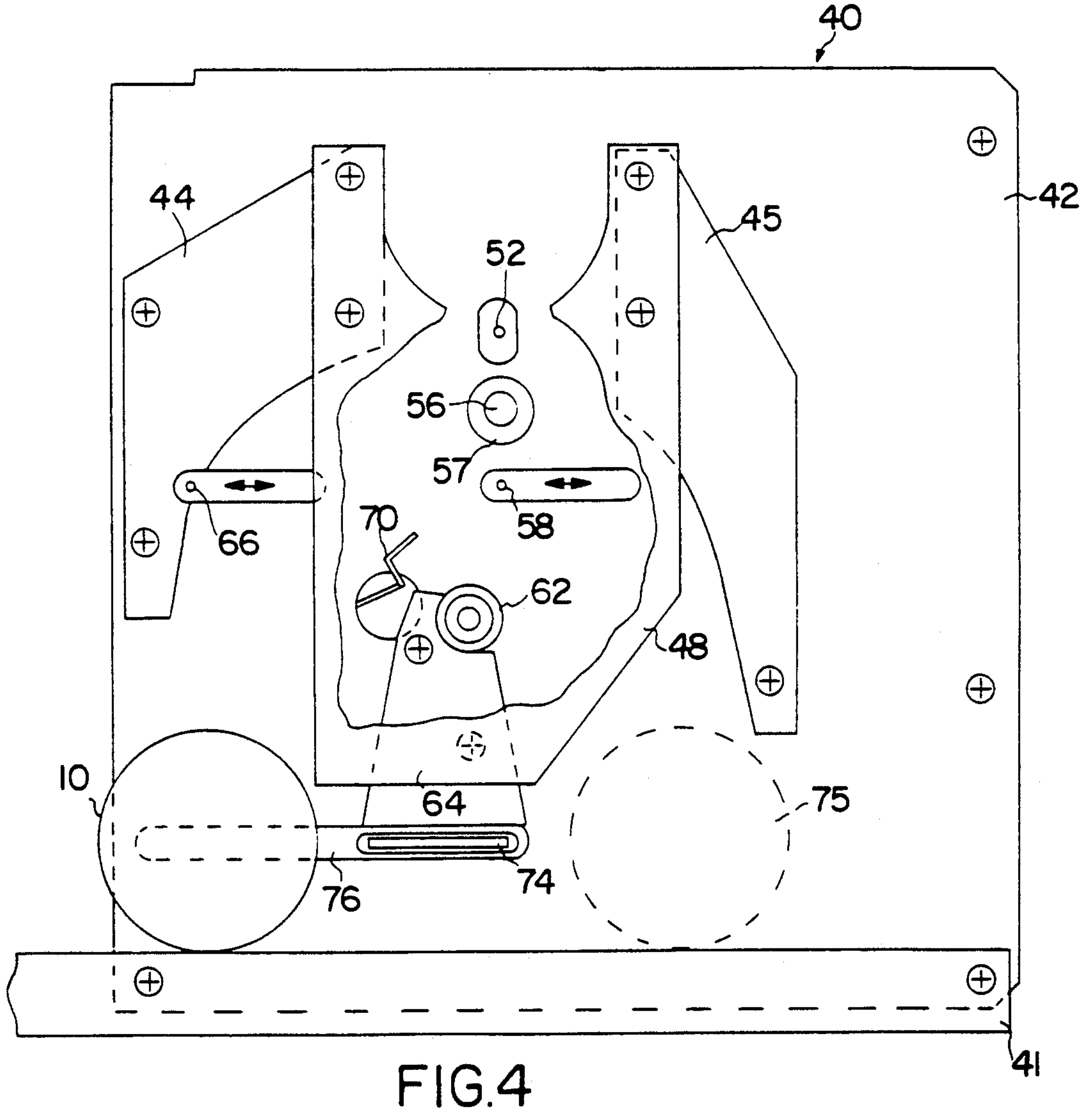
FIG. 4 is a partially broken, front elevational view of the table chip validating device of FIG. 2 showing the table chip in either the accept or reject positions.

If the chip is to be rejected, accept pin 66 is maintained in its normally actuated-out position and positioning pin 58 is actuated-in so as to clear an open passage between right chip guide 45 and center chip guide 64, so that the rejected chip can drop onto bracket 41, as illustrated by the dotted line illustrating a rejected chip 75 in FIG. 4.

Chips can be rejected for a wide variety of different reasons, and for each different reason, a different response may be generated by the validator control system. For example, if the quantity of encoded bits does not correspond to the value of the chip sum sector 28, then the chip will be rejected and a silent alarm will be activated informing the casino's security and floor mechanics that a particular machine has received either a damaged, counterfeit, or tampered chip. So as to not alert the player who inserted the chip, the machine could be programmed to continue operating as usual and to train a hidden camera on that particular machine to collect evidence regarding the player.

The machine could also be programmed to activate a tilt light or fault light, which would help to distinguish between good faith and bad faith players. Typically, a bad faith player, that has knowingly used a counterfeit or tampered chip, will not remain in the immediate area so as to avoid being caught by casino security. An innocent good faith player, on the other hand, will stay at the machine until refunded or the machine has been put in working order.

The validator's control system could also possess the ability to match the serial number of the chip being read and to compare that serial number with a lookup table of serial numbers stored in an externally or internally located memory. This feature would allow the machine to determine whether the serial number matches a known serial number issued by that casino and whether the currency, denomination and casino identification numbers are correct for that particular chip. Since such a verification routine could be performed within a matter of microseconds, provided that the memory is not located in too remote a location and the lookup table is not too large, the amount of time required to verify the chip would be insignificant.

Figure 5:
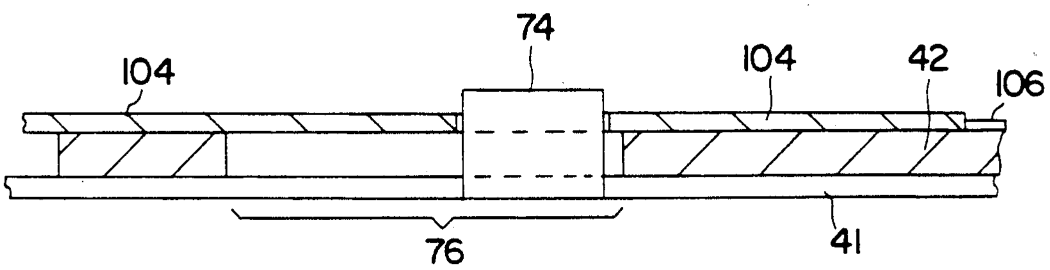
FIG. 5 is a cross-sectional view of the table chip validating device of FIG. 2 taken through the line 5—5 and further illustrating the orientation of the slide bar of a preferred embodiment of the present invention.
Figure 6:
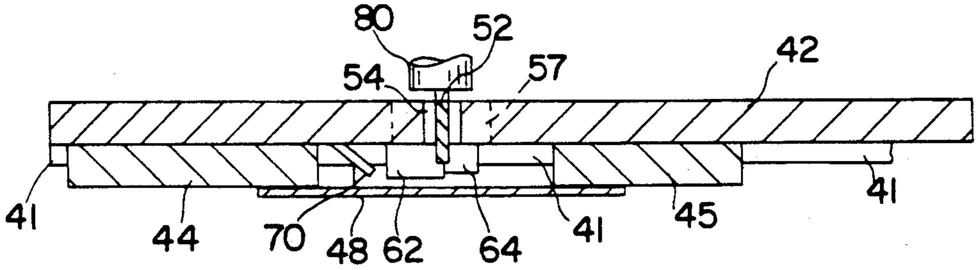
FIG. 6 is a partially broken, top plan of the table chip validating device of FIG. 2 taken between the line 6—6 and further illustrating the lockout pin feature of the preferred embodiment of the present invention.

FIGS. 5 and 6 illustrate cross-sectional views of validator 40 taken along lines 5—5 of FIG. 2 and 6—6 of FIG. 2 respectively. FIG. 5 illustrates that slide bar slot 76 within back plate 42 extends through back plate 42 and along the length of the bracketed distance shown. FIG. 5 also illustrates that slide bar 74 projects perpendicularly from both sides of back plate 42. FIG. 6 illustrates the relative position of chip 10 at the point of contact between chip 10 (shown in part by a solid line at the approximate point of contact, and in part by dashed lines to illustrate the area occupied by chip 10) and lockout pin 52.

Figure 7B:
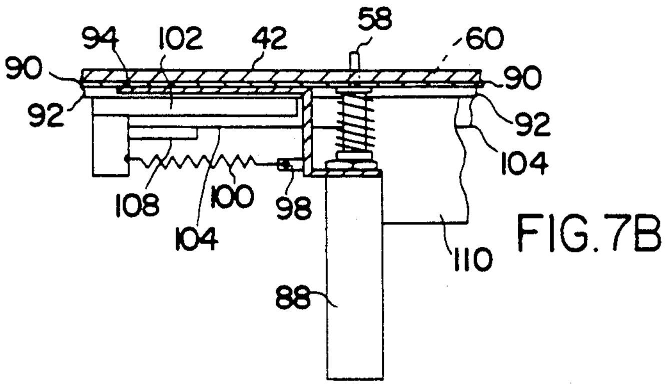
FIG. 7B is a partially broken cross-sectional view taken along the line B—B of FIG. 7A, illustrating the solenoid and linear slide assembly of FIG. 7A.
Figure 7A:
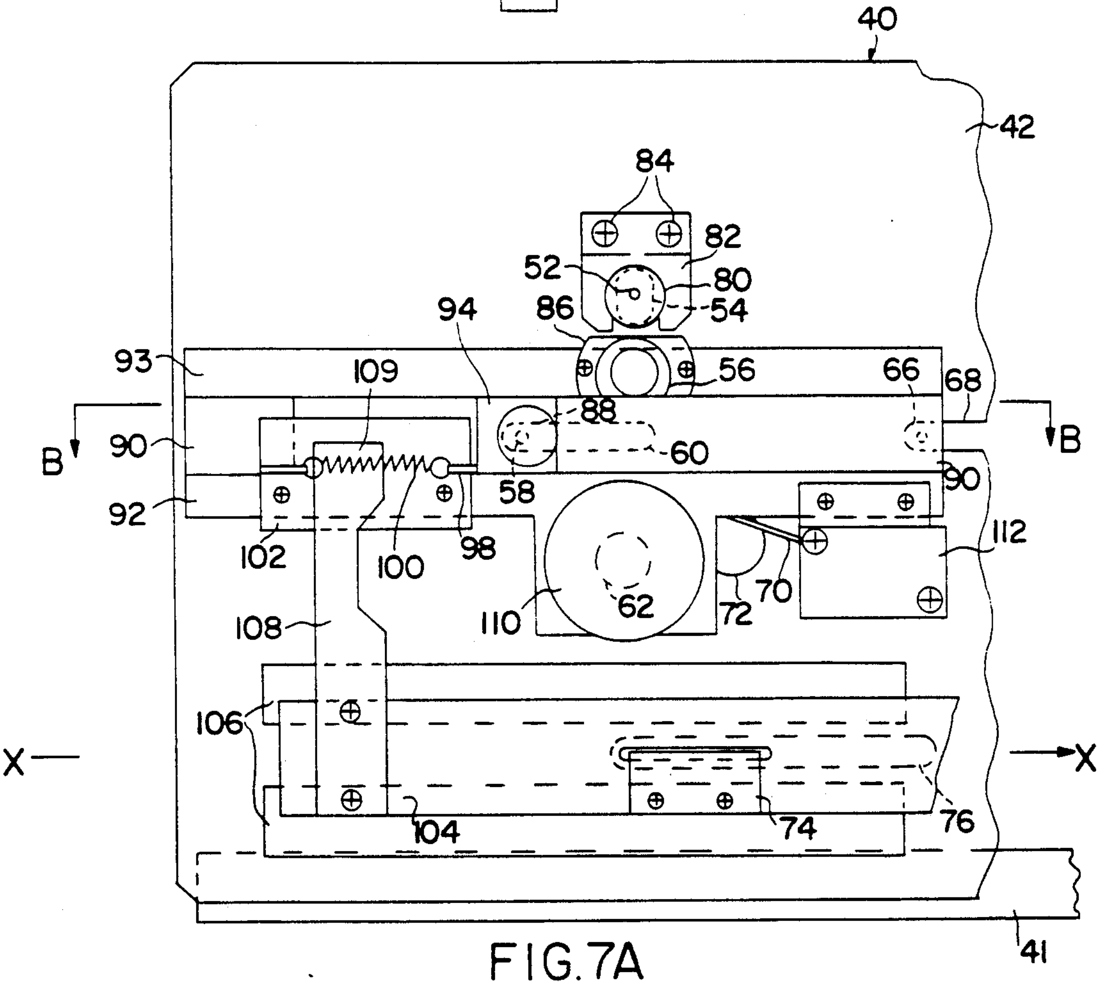
FIG. 7A is a partially broken, rear view of the table chip validating device of FIG. 2.

With reference now to FIG. 7A, the backside of back plate 42 is illustrated so as to better define the operation of validator 40. In addition, a number of the components 10 of validator 40 are also shown turned 90 degrees so as to properly show their alignment and operation with respect to the backside of back plate 42. Lockout pin 52 is actuated so as to move into and out of the plane of the front (or back) side of back plate 42 by a pull-type, tubular solenoid 80. Solenoid 80 is secured to the backside of plate 42 by a solenoid bracket 82 and held in place by screws 84. A similar bracket 86 supports optical sensor 56.

Positioning pin 58 is activated by solenoid 88, which is also a pull-type, tubular solenoid, but which is mounted on a different type of support system. Because positioning pin 58 must not only move in and out of the back plate plane, but also laterally, parallel to that plane so as to move accepted chips out of the read position, the solenoid 88 is secured to a linear slide 90. Linear slide 90 is positioned between the edges of two guides 92 and 93, and has a linear range limited by the linear distance which positioning pin 58 can move within positioning pin slot 60.

FIG. 7B, a partially-broken cross-sectional view of solenoid 88 and linear slide 90, taken along line B—B of FIG. 7A. Solenoid 88 is secured to linear slide 90 by a solenoid bracket 94, so as to leave sufficient room for operation of solenoid spring 96. Solenoid bracket 94 also includes a spring clip 98, which is affixed to a linear motion spring 100. Spring 100 is in turn affixed, at its opposite end, to a guide plate 102, which is affixed to one of the guides 92.

Another linear slide 104 and two guides 106 are located toward the bottom of back plate 42. Slide 104 is operated by a cam on an A.C. motor (schematically shown in FIG. 8), which moves the slide back and forth in accordance with commands received from the validator control system each time a chip is accepted. Slide bar 74 is affixed to slide 104 and has a linear range limited by the linear distance which slide bar 74 can move within slide bar slot 76. Also affixed to slide 104 is actuator arm 108, which moves in the same linear direction as slide 104.

Guide 92 also supports D.C. drive motor 110, which drives the drive wheel 62. The motor 110 is actuated by coin switch 112, which is connected to wireform detector 70 through wireform detector hole 72. As is further illustrated with reference to FIG. 8, when wireform detector 70 is caused to be depressed by a chip 10 being guided into the reading position, coin switch 112 is activated to send electrical signals to lockout pin solenoid 80, D.C. motor 110, and optical sensor 56, thereby causing the reading process to take place. Validator control system 114 then sends a signal back to solenoid 80 causing it to be activated-out, so as to prevent other chips from entering the reading position. The D.C. motor 110 and sensor 56 then continue to be controlled by system 114 until the chip has been read and analyzed, at which point motor 110 and sensor 56 are shut off and A.C. motor 115 is activated.

When the validator's electro-optical and electromechanical elements receive an accept signal from the validator's control system after reading a chip in the reading position, slide 104 is driven in the X direction by the A.C. motor 115. This causes the upper end 109 of the actuator arm 108 to contact solenoid bracket 94, thereby causing linear slide 90 to move to the right (as depicted in FIGS. 7A and 7B). The lateral motion of linear slide 90 moves the accept pin 66, which is engaged thereto, to the right as well. Thus the motion of the actuator arm 108 causes the positioning pin 58 to push the accepted chip out of the reading position. When the positioning pin 58 is moved out of the reading position, linear motion spring 100 is extended. Since slide 104 is operated by a cam, it then returns to its starting position, and linear motion spring 100 returns from its extended position so as to return positioning pin 58 to the reading position. When a reject signal is received from the validator's control system 114, the actuator arm 108 is not activated. The accept pin 66 maintains its position while positioning pin 58 is simply actuated-in by a signal from the validator control system 114 to the solenoid 80, thus allowing the chip to drop into the rejected chip area.

Figure 9:
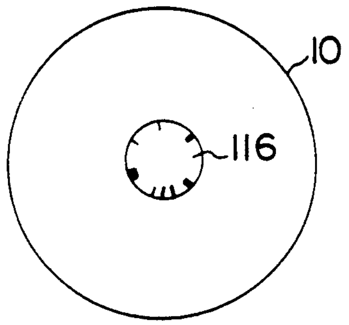
FIG. 9 is a first alternative embodiment of the table chip illustrated in FIG. 1.
Figure 10:
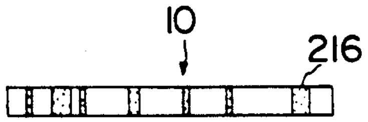
FIG. 10 is a second alternative embodiment of the table chip illustrated in FIG. 1.

FIGS. 9 and 10 illustrate alternative embodiments of the chip of the present invention in which the position of the circular bar code 116 is located somewhere on the chip 10 other than where shown in FIG. 1. FIG. 9 illustrates a first alternative embodiment in which the circular bar code is simply reduced in size and moved to a position more proximate the center of chip 10, so as to encircle less than 50% of the surface area of the face of chip 10. Positioning the circular bar code in this position only creates an alternative embodiment which requires that certain portions of the validator mechanism be likewise reduced in size or moved to accommodate the smaller code and its new position. FIG. 10, on the other hand, illustrates a second alternative embodiment in which the circular bar code 216 is positioned only around the edge of chip 10 rather than on the front and rear faces of chip 10 as illustrated in FIGS. 1-7. This second alternative embodiment would require modification of the layout of the validator mechanism 40 so as to reposition the optical sensor 56, but would otherwise not significantly change the method and apparatus for accepting and processing an input chip.

Figure 11:
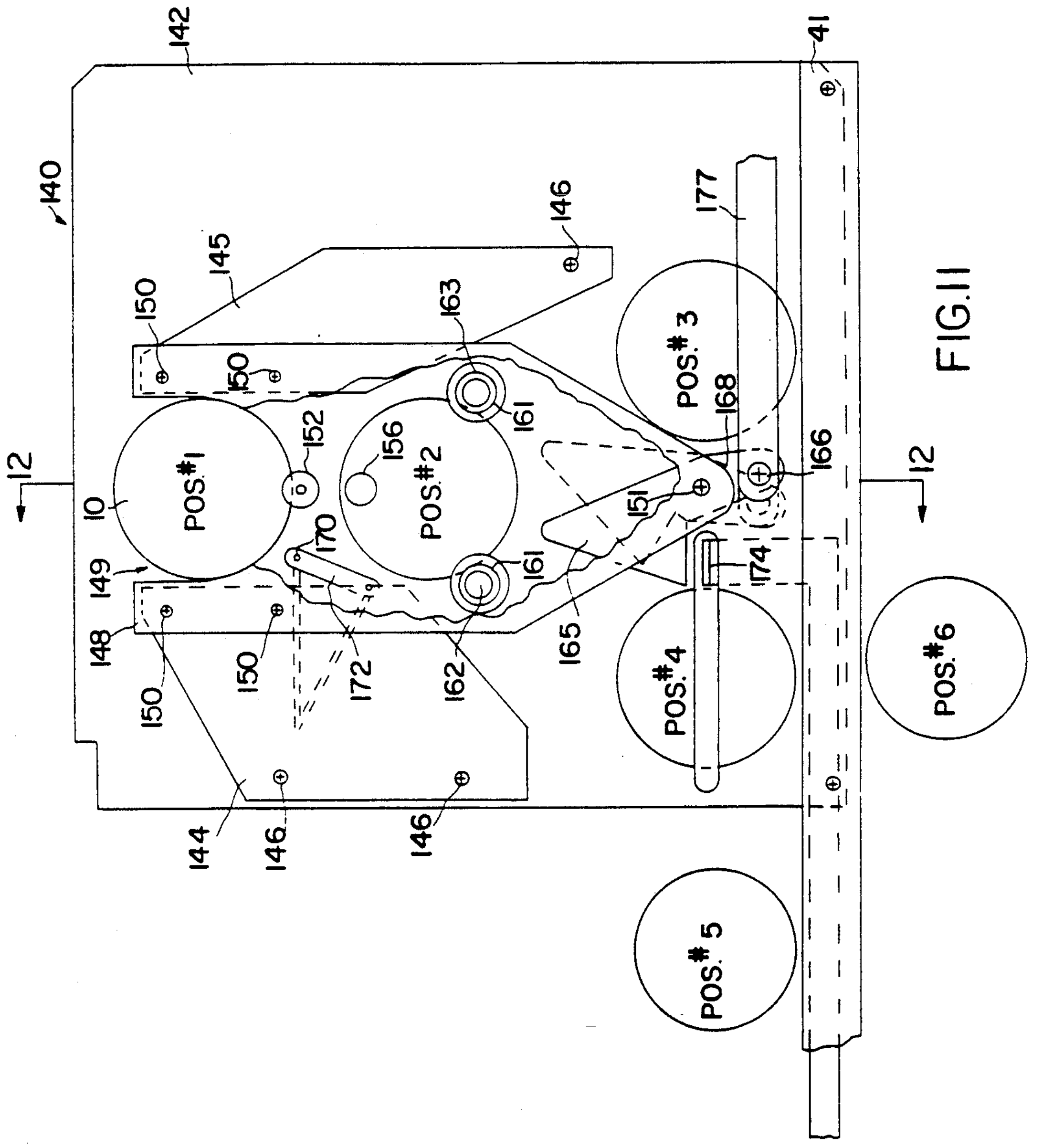
FIG. 11 is a partially broken, front elevational view of an alternative embodiment of the table chip validating device showing a table chip in various positions.

FIG. 11 illustrates a table chip validator 140 in an alternative embodiment. Similar to the preferred embodiment 40 of FIGS. 2–8, left-chip guide 144 and right-chip guide 145 are affixed to the front side of back plate 142, secured by screws 146. A front cover plate 148 is positioned over the opening between guide 144 and guide 145, and secured by screws 150 which also serve to hold the guides 144 and 145 in place. The front cover plate 148 has a semicircular cutout at its top so that a chip 10 may be inserted and specifically directed into validator 40 when inserted into the gaming machine.

When a chip 10 is inserted into the gaming machine, it will be held in a lockout area (Position #1) by the lockout pin 152 which will be in an actuated-out position if another chip is in the reading area (Position #2). If the reading area is empty, the lockout pin 152 will be in its normal actuated-in position, and the chip 10 will be guided directly into the reading area. The chip is held in position in the reading area by being cradled between two drive wheels 162 and 163, the backing plate 142, and the front plate 148.

The drive wheels 162 and 163 are disposed at the lower quadrants of the reading area such that when a chip 10 is guided into the reading area (Position #2), it is held in position by one drive wheel 162 at the bottom left of the chip 10, the other drive wheel 163 at the bottom right of the chip 10, and the backing plate 142. In this alternate embodiment, the use of two drive wheels replaces the need for a positioning pin 58 and an accept pin 66 as previously shown and described. The two drive wheels, together with the backing plate, position the chip 10 in the proper position for reading the chip, and a diverter arm 165 directs the chip 10 into an accepted chip area or a rejected chip area. The diverter arm 165 has an apex portion 166 which is directed upwardly toward the reading area (Position (#2). The diverter arm 165 is pivotally mounted on a pin 151, and includes a lower projecting arm portion 168 that is joined by a pin 166 to an actuator link 177.

A wireform switch 170 projects through a slot 172, formed through the backing plate 142, into the reading area. When the chip 10 is guided from the lockout area (Position (#1) to the reading area (Position #2), it trips the switch pin 170, which results in an electrical signal being transmitted to the drive motor, thereby activating the drive wheels 162 and 163. Frictional contact between the edge of the chip 10 and the rotating drive wheels 162 and 163 then causes the chip 10 to spin. Rubber O-rings 161 may be disposed upon the drive wheels 162 and 163 to enhance the frictional contact of the drive wheels with the edge of the chip 10. While the chip 10 is spinning in the reading area, the optical reader 156 reads the information encoded on the chip 10. After the validator 140 has read the chip information, the validator's control system processes the information and indicates to the validator 140 whether the chip 10 is to be accepted or rejected.

If the chip 10 is to be accepted, the validator's control system will activate a solenoid operated link 177 which causes the diverter arm to pivot so as to move the apex 166 of the diverter arm 165 to the right, shown in FIG. 11 in dashed lines, thus creating a direct passage for the chip to pass through onto the upper surface of the slide bar 174 (Position #4). The motor driven slide bar 174 moves within the slide bar slot 176 to push the accepted chip into either a viewing channel (Position #5 in FIG. 11) or, if it were preferred, into an accepted chip holding area (shown generally as Position #6 in FIG. 11). Conversely, if the chip 10 is to be rejected, the apex 166 of the diverter arm 165 will be moved to the left, shown in solid lines in FIG. 11, creating a passage for the chip to pass into a holding area for rejected chips (Position #3). As is next described, in order for a chip in Position #2 to reach either of Position #3 (reject) or Position #4 (accept), the drive wheels 162 and 163 must be first removed from the path of the chip.

Figure 13:
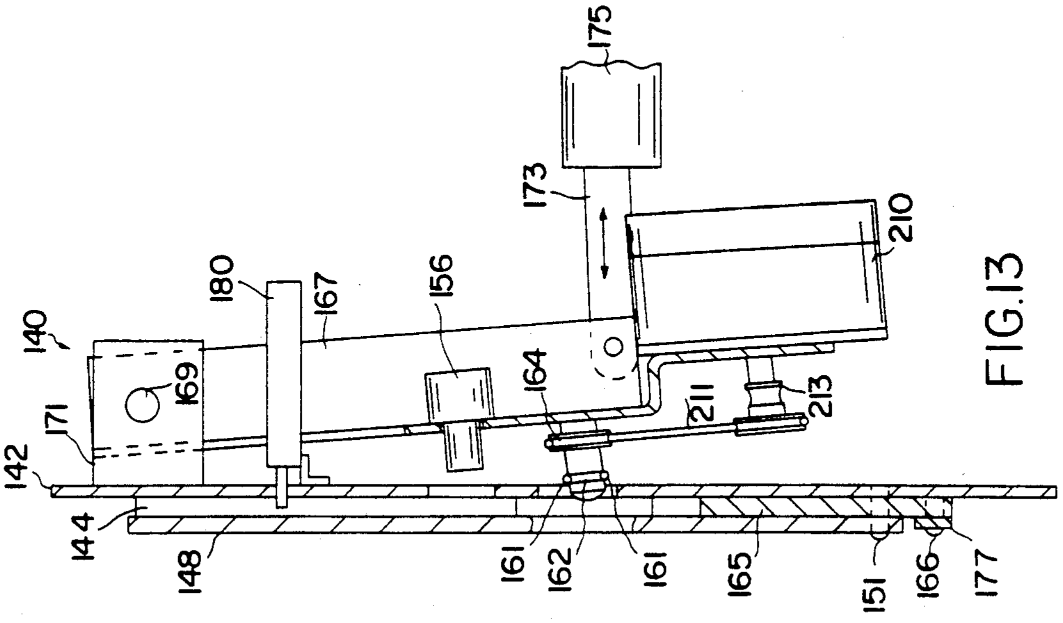
FIG. 13 is a cross sectional view of the table chip validating device as shown in FIG. 12, showing the driver plate assembly in the chip release mode.
Figure 12:
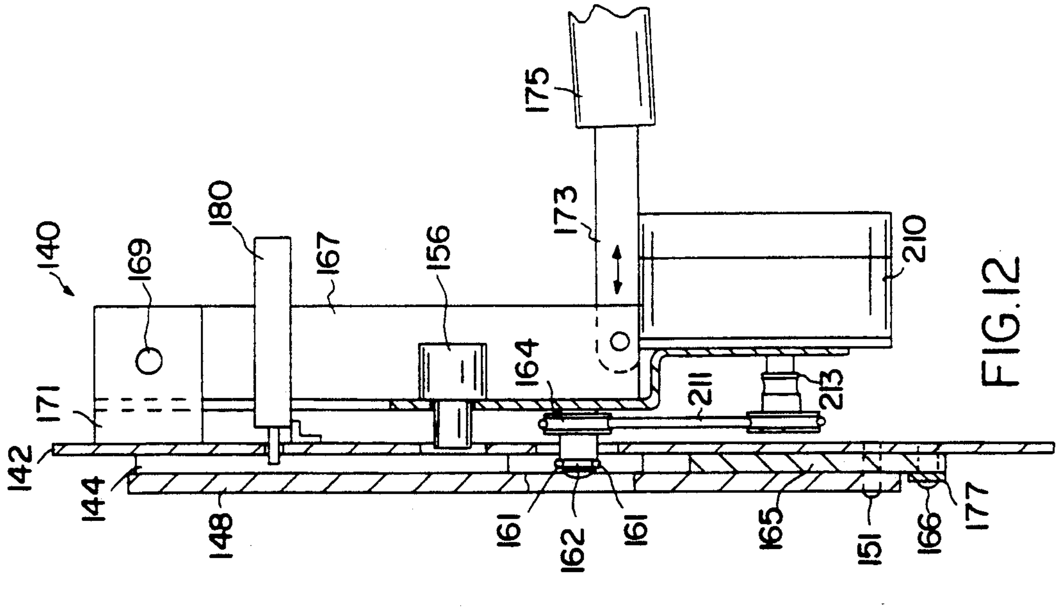
FIG. 12 is a cross sectional view of the table chip validating device of FIG. 11 taken along the line 12—12 of FIG. 11, showing the driver plate assembly in the chip insertion and read chip mode.

Generally speaking, as illustrated in FIGS. 12 and 13, instead of moving a pair of accept or reject pins (58 and 66) as in the preferred embodiment 40, the chip 10 in the validator 140 is released from the reading area (Position #2) when a driver plate assembly 167 is pulled back, thus moving the drive wheels 162 and 163 out of the reading area. With the drive wheels 162 and 163 out of the way, a passage is created from the reading area to either the rejected chip holding area (Position #3 in FIG. 11) or the initial accepted chip position (Position #4 in FIG. 11) atop the slide bar 174.

More specifically, FIG. 12 is a cross sectional view of the validator 140 taken along line 12—12 of FIG. 11 illustrating the drive wheel 162 and driver plate assembly 167 in a normal position for chip insertion and reading of the chip. The driver plate assembly 167 is appended to the back side of the backing plate 142 by a bridge 171, and moves about a pivot pin 169 which attaches the driver plate assembly 167 to the bridge 171 and allows the driver plate assembly to move in an inwardly direction, away from the backing plate 142. The drive wheels 162 and 163 are attached to the driver plate assembly 167 such that they project outwardly into the reading area during chip insertion and chip reading, thus preventing the chip 10 from dropping into the accepted chip area or rejected chip area. The drive wheels 162 and 163 are connected to a drive motor 210 by a drive belt 211 and motor shaft 213 assembly. Each drive wheel 162 and 163 rotates freely upon a shaft (not shown), and has a pulley channel 164 in which the drive belt 211 rides.

FIG. 13 illustrates the validator 140 as shown in FIG. 12, in the chip release position. After the validator has read the chip, determined if it should be accepted or rejected, and activated the diverter arm 165 accordingly, it signals a solenoid 175 that activates the movement of the driver plate link 173. The lateral movement of the driver plate link 173 pulls the driver plate assembly 167 back, away from the backing plate 142, such that the drive wheels 162 and 163 are no longer within the reading area. When the drive wheels 162 and 163 are pulled back, a passage is cleared between the reading area and either the rejected chip area or the accepted chip area, depending on the position of the diverter arm, and the chip will pass accordingly.

Figure 14:
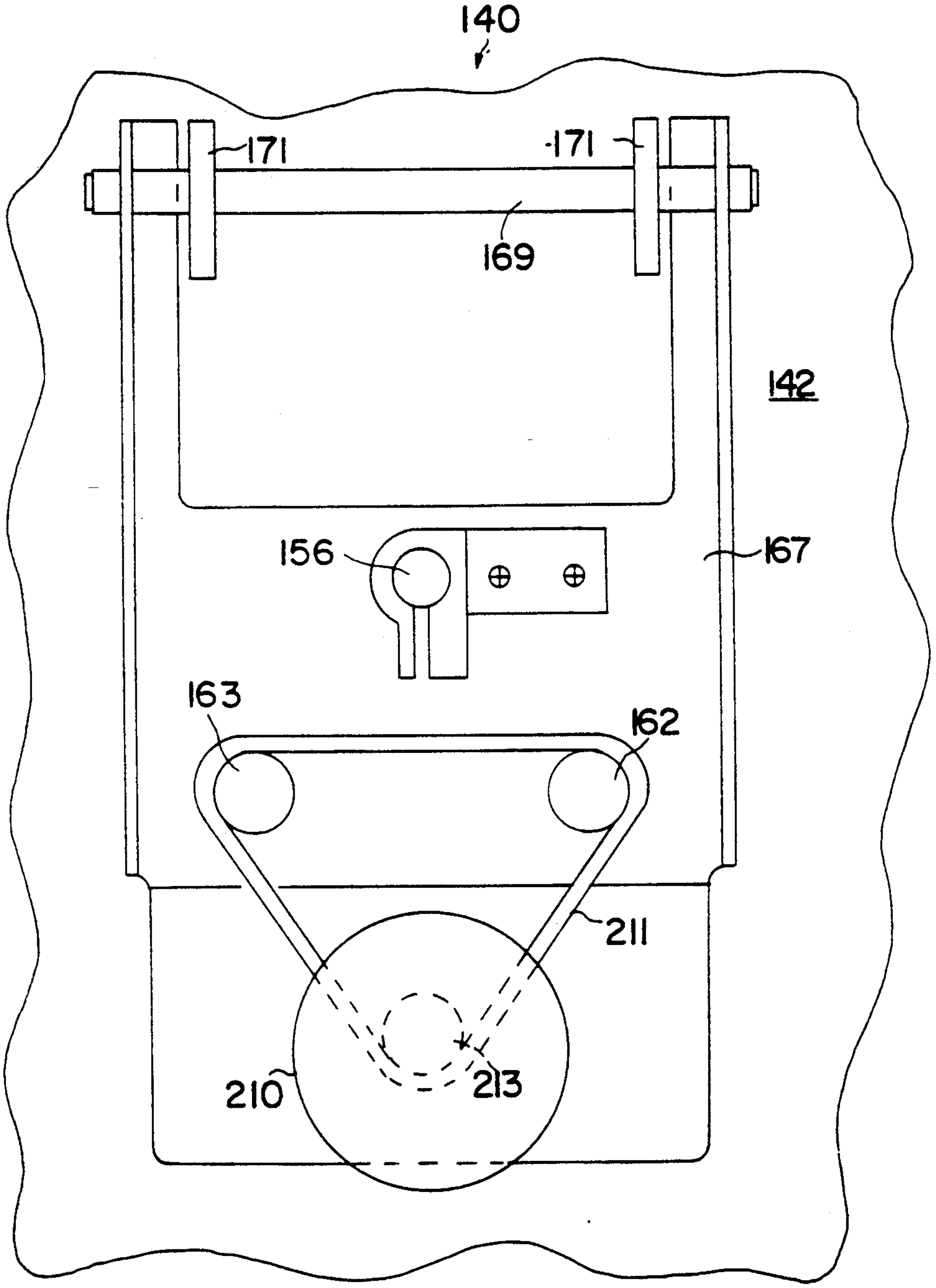
FIG. 14 is a partially broken rear view of the table chip validating device of FIG. 11.

FIG. 14 is a simplified, partial rear view of the validator 140. This view illustrates the generally triangular configuration of the drive belt 211 which is driven by the motor 210 to turn the drive wheels 162 and 163. The optical reader 156 is bracketed to the rear face of the driver plate assembly 167 proximate the center of the plate. The cylindrical pivot pin 169 spans the full width of the driver plate assembly 167 to join the driver plate assembly 167 to the bridges 171 that are joined to the back plate 142.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An apparatus for reading and authenticating the validity of a gaming chip, said gaming chip including a disk-shaped body having a front surface, a rear surface, an annular edge surface, a central axis passing through said front surface and said rear surface, and at least one circular encoded band formed on at least one of said surfaces, said band including indicia representative of a plurality of data bits serving to identify said chip, comprising:

a chip reading area being located within said apparatus;

means for positioning and rotating said chip about said central axis while said chip is disposed within said chip reading area;

means for reading said indicia when said chip is rotated in said reading area and outputting a first signal corresponding to said indicia; and means for receiving and analyzing said first signal and outputting an accept or reject signal; and means for moving said chip into either an accepted or a rejected position in response to said accept or reject signal.

2. An apparatus for reading a gaming chip as recited in claim 1, wherein said rotating means includes a drive means for engaging said edge surface and rotating said chip about its central axis, and wherein said positioning means includes a structural member for engaging said edge surface to position said chip so as to be cradled between said structural member and said drive means while said chip is rotated by said drive means.

3. An apparatus for reading a gaming chip as recited in claim 2, including a second drive means such that said chip is cradled between two drive means when rotated.

4. An apparatus for reading a gaming chip as recited in claim 3, further including a guiding means for receiving a plurality of said chips and for guiding one of said chips at a time into said reading area.

5. An apparatus for reading a gaming chip as recited in claim 4, wherein said guiding means includes a detector means for determining when one of said chips is in said reading area and outputting a detector signal; and said guiding means including a closing means for receiving said detector signal and preventing additional ones of said chips from being guided into said reading area until said chip in said reading area is moved out of said reading area in response to said first signal.

6. An apparatus for reading a gaming chip as recited in claim 1, wherein said reading means includes an optical sensor positioned so as to detect said indicia when said chip is rotated in said reading area.

7. An apparatus for reading a gaming chip as recited in claim 1, wherein said moving means includes means for moving said chip out of said reading area in a first direction if said chip is accepted, and moving said chip out of said reading area in a second direction if said chip is rejected.

8. An apparatus for reading a gaming chip as recited in claim 1, further including a guiding means for receiving a plurality of said chips and for guiding one of said chips at a time into said reading area.

9. An apparatus for reading a gaming chip as recited in claim 8, wherein said guiding means includes a detector means for determining when one of said chips is in said reading area and outputting a detector signal; and said guiding means including a closing means for receiving said detector signal and preventing additional ones of said chips from being guided into said reading area until said chip in said reading area is moved out of said reading area in response to said first signal.

10. An apparatus for reading a gaming chip as recited in claim 9, wherein said moving means includes means for engaging said positioning means and moving said positioning means in a first direction if said chip is accepted, and moving said positioning means in a second direction if said chip is rejected.

11. An apparatus for reading a gaming chip as recited in claim 5 wherein said moving means includes means for releasing said chip from said reading area in response to said accept or reject signal.

12. An apparatus for reading a gaming chip as recited in claim 11 wherein said moving means further includes means for moving said released chip in a first direction if said chip is accepted, and moving said released chip in a second direction if said chip is rejected.

13. An apparatus for reading a gaming chip as recited in claim 7 further including a guiding means for receiving a plurality of said chips and for guiding one of said chips at a time into said reading area.

14. An apparatus for reading a gaming chip as recited in claim 13, wherein said guiding means includes a detector means for determining when one of said chips is in said reading area and outputting a detector signal; and said guiding means including a closing means for receiving said detector signal and preventing additional ones of said chips from being guided into said reading area until said chip in said reading area is moved out of said reading area in response to said first signal.

15. An apparatus for reading a gaming chip as recited in claim 14 wherein said moving means includes means for engaging said positioning means and moving said positioning means out of said reading area to release said chip.

16. A method for authenticating a gaming chip, said gaming chip including a disk-shaped body having a front surface, a rear surface, an annular edge surface, a central axis passing through said first surface and said second surface; and at least one circular encoded band formed on at least one of said surfaces, said band including indicia representative of a plurality of data bits serving to provide information about said chip, comprising the steps of:

positioning said chip in a reading position so as to allow said chip to be rotated about said central axis;

reading said indicia from said chip while said chip is rotated in said reading position and developing a first signal corresponding to said data bit information of said chip; and receiving said first signal and analyzing said first signal to determine whether said chip is accepted or rejected.

17. A method for authenticating a gaming chip as recited in claim 16, wherein said band is divided into a plurality of sectors, wherein at least one of said sectors includes said indicia serving to identify at least one characteristic of said chip, and wherein said step of analyzing said first signal includes the step of comparing at least one characteristic of said chip with a list of acceptable characteristics of such chips to determine whether said chip is accepted or rejected.

18. A method for authenticating a gaming chip as recited in claim 17, wherein there are a plurality of said characteristics, wherein one of said characteristics identifies an issuer of said chip, and wherein said step of comparing includes comparing said issuer with a list of acceptable issuers to determine whether said chip is accepted or rejected.

19. A method for authenticating a gaming chip as recited in claim 17, wherein there are a plurality of said characteristics, wherein one of said characteristics identifies a currency for said chip, and wherein said step of comparing includes comparing said currency with a list of acceptable currencies to determine whether said chip is accepted or rejected.

20. A method for authenticating a gaming chip as recited in claim 17, wherein there are a plurality of said characteristics, wherein one of said characteristics identifies a denomination of said chip, and wherein said step of comparing includes comparing said denomination with a list of acceptable denominations to determine whether said chip is accepted or rejected.

21. A method for authenticating a gaming chip as recited in claim 17, wherein there are a plurality of said characteristics, wherein one of said characteristics identifies a serial number for said chip, and wherein said step of comparing includes comparing said serial number with a list of acceptable serial numbers to determine whether said chip is accepted or rejected.

* * * * *